May 29, 1951 R. S. OHL 2,555,001

BONDED ARTICLE AND METHOD OF BONDING

Filed Feb. 4, 1947

INVENTOR
R. S. OHL
BY
T. B. H. Jackson
ATTORNEY

Patented May 29, 1951 2,555,001

UNITED STATES PATENT OFFICE 2,555,001

BONDED ARTICLE AND METHOD OF BONDING

Russell S. Ohl, Red Bank, N. J., assignor to Bell Telephone Laboratories, Incorporated, New York, N. Y., a corporation of New York Application February 4, 1947, Serial No. 726,408

12 Claims. (Cl. 175—366)

Figure 1:
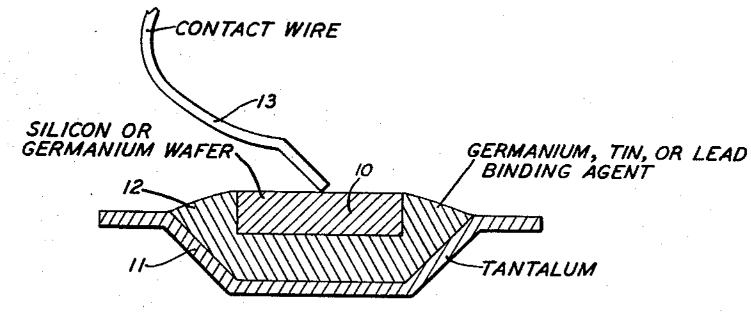

This invention relates to devices composed of several parts, said parts joined together by bonding, and to methods of making such devices.

More particularly, the invention relates to the manufacture of articles such as alternating current rectifiers, negative resistance devices, diamond cutting tools and the like out of elements which are taken from group IV–A of the periodic table, as classified by Deming, which have an atomic number not greater than 32 and which have the diamond cubic crystalline structure. This group consists of the diamond cubic crystalline forms of carbon, silicon and germanium. According to the invention, bodies of these elements are bonded to one another or to other bodies by an element from said group IV–A having a higher atomic number, which element may be silicon, germanium, tin or lead, or in some instances, a mixture of two such elements.

Deming's widely used arrangement of the periodic table may be found in Deming's "General Chemistry" (fourth edition), published by John Wiley and Sons, New York. This table is also found on page 340 of the "Handbook of Chemistry and Physics," twenty-first edition, published by the Chemical Rubber Publishing Company, Cleveland, Ohio.

In each case it is preferable to bond the bodies of diamond, silicon or germanium with the element of Group IV–A of the periodic table which lies in the next higher period, since the elements thus related form a strong bond most readily and since the melting points of the elements of Group IV–A, with the exception of lead, decrease with increasing atomic weight. Lead, which has the highest atomic weight, possesses a melting point which lies between tin and germanium. Thus, the best results are obtained when diamond is bonded with silicon, when a silicon body is bonded with germanium, and when a germanium body is bonded with tin.

Good results are also obtained when bodies of diamond, silicon or germanium are bonded with the element of Group IV–A which lies in the second higher period. Thus diamond may be bonded with germanium, silicon may be bonded with tin and germanium may be bonded with lead or a tin-lead alloy.

In each case, the bonding is accomplished by heating the diamond, silicon, or germanium in contact with the appropriate bonding element at a temperature at or above the melting point of the bonding element and below the melting point of the substance being bonded.

In the making of devices such as rectifiers or negative resistance devices, which comprise a wafer-like silicon or germanium element attached to a base, it has often been difficult to find suitable means for attaching such elements to their bases. Not only should the bond between the element and the base be mechanically strong, but in order to permit the most efficient operation it should offer as little resistance to the flow of electrical current as possible.

In the past it has often been the custom to bond the wafer-like element to its base by first electroplating the back of the wafer with a metal like nickel or rhodium, and then soldering the plated element to a suitable base by means of any desirable solder. The bond thus formed between the wafer element and its base was not as firm as desired, for ordinarily the metal used to plate the back of the wafer, such as nickel or rhodium, was not capable of alloying with or wetting the material of the wafer element. Consequently, the bond between the plated metal and the wafer element was a superficial one, formed only at the surface. With this method of attaching the wafer to its base, a relatively small mechanical force would be sufficient to tear the element off its base.

In the method used by the present invention for forming the bonds between the wafer element and its base, a material is used for the bonding agent which is capable of wetting or partially alloying with the material of the wafer element. Consequently, when the bonding agent in its molten state is placed in contact with the wafer element, some of the molecules of the bonding agent will diffuse into the top surface layers of the wafer element, so that wetting or alloying at the surface results. Thus an intimate union between the bonding agent and the wafer element is formed. The wafer element, when bonded in this way, adheres tenaciously to its base even when subjected to severe stress. However, it is important that the alloy be formed only at the mutual surface between the bonding agent and the wafer element, for if the bonding agent and the material of the wafer element dissolved in each other entirely, the device might cease to operate or else the bond formed would be a brittle one.

The bonds formed by the present invention are stable even at high temperatures. In the past when ordinary solders have been used, having relatively low melting points such as in the range of about 150° C., the bond has become weakened due to the softening of the solder when the device became heated up because of large currents passing through it. The present invention avoids this difficulty when high melting material is used to form the bond. The bonds formed by the present invention from high melting bonding agents remain stable at high temperatures. When the bonding agent is silicon, the bond is stable up to about 1200° C., with germanium up to about 800° C., with tin up to about 175° C., and with lead up to about 250° C.

A further advantage of the present invention is that it provides a means for obtaining a strong bond which offers little resistance to the passage of electric current, which provides for the more efficient operation of certain devices. Likewise, the present invention provides a method of getting a good thermal bond which facilitates in the transfer of heat.

It is believed that the good electrical and thermal conductivity found in the bonds formed by the present invention is due to the fact that the bonding agent and the wafer element are intimately joined at their contacting surfaces.

The present invention also provides a superior method for bonding diamonds or diamond particles, particularly in making diamond cutting tools. Previously, in making such tools the diamonds were embedded in metal matrices formed of one of the ordinary hard solders such as silver solder or of sintered particles of other metals, which were not capable of wetting the diamond surface. As a result, the bond between the diamond and the binding material was a superificial one, and when such a tool was used as a saw or an abrasive, the diamonds frequently worked loose, producing a chatter which resulted in breaking the sharp cutting edge. According to the present invention the diamond bodies may be embedded in an element easily capable of wetting the diamond surface so that a strong and rigid bond results, making a durable tool capable of hard usage without breaking down.

Figure 2:
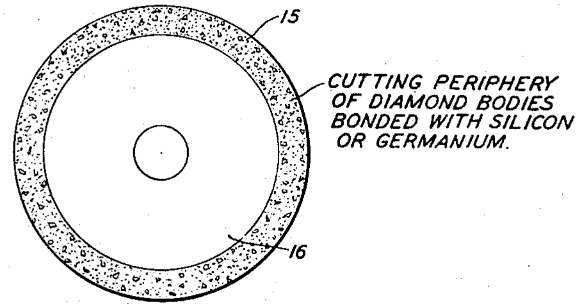

These and other advantages of the present invention, and the structure of various devices embodying the invention will be more fully apparent from the following description in connection with the appended drawings, in which:

Fig. 1 shows a side elevation, in section, of a rectifier or a negative resistance device made according to the process of the present invention; and Fig. 2 shows a side elevation of a cutting tool made according to the process of the present invention.

Fig. 1 depicts a structure which may be either a rectifier or a negative resistance device or a thermo-sensitive device or a photosensitive device according to the method of making the wafer element 10. The wafer 10 is attached to the tantalum base 11 by means of the bonding agent 12. The device may be connected in a suitable circuit, which includes contact wire 13.

In preparing a device as shown in Fig. 1, the bonding material is fused in a tantalum cup by placing a bit of the solid binder in the tantalum cup and heating it to a temperature somewhat above the melting point of the binder to cause it to fuse to the tantalum base. The cup and the binder are then cooled and a silicon or germanium wafer element, which may be an element for a rectifier or a negative resistance device, or a thermo-sensitive device or a photosensitive device, is placed on the binding agent, and the assembly is then heated again beyond the melting point of the binding agent, causing it to fuse and adhere to the wafer element. The heating and cooling should be done in an inert atmosphere such as a high vacuum which may be $10^{-6}$ mm. of mercury or an atmosphere of argon or some other inert gas, because tantalum forms nitrides and oxides when heated in the presence of oxygen or nitrogen.

Although tantalum is the preferred metal to use for the base, other metals may be used such as columbium or nickel. The choice of metal to be used is partly a matter of economy, and also depends on the nature of the material used as the binding agent. For example, the metal used for the cup should be capable of alloying with the binding agent at their surfaces of contact, but the metals of the cup and the binding agent should not be able to alloy or dissolve in each other completely, or to such an extent that a brittle bond would be formed. The cup whether made of tantalum or some other material may be bonded to a suitable base material such as nickel by spot welding or by any other suitable means.

The choice of materials for the element and the binding agent depends of course on the character of the device it is desired to make. For example, for a rectifier, when silicon is used to form the wafer, then germanium or tin can be used as the bonding agent. When the rectifier element is made of germanium, tin or lead can be used for the binder. When a negative resistance element is being made, silicon can be used to form the wafer with germanium or tin as the bonding agent.

Ordinarily it is preferable to use as the binding agent the element from the same group in the periodic table which is next highest in atomic number to the element of which the wafer or other device is made, although if desired the element which is the second highest in atomic number may be used. For example, it is preferable to bond silicon with germanium because the bond is formed quite readily at temperatures at which germanium is molten. Although tin may be used to bond silicon, the tin usually must be heated to a temperature considerably above its melting point, such as about 800° C. to 900° C. before the bond will form.

If the wafer for the rectifier is to be made of silicon, one method which may be used to make it is that described in the application of R. S. Ohl, Serial No. 530,419, filed April 10, 1944, now Patent No. 2,437,269. This method comprises cutting a wafer of silicon from a body of fused pure silicon. polishing the surface of the wafer to an optical finish, heating the wafer in an oxidizing atmosphere to form a crust of silica over the polished surface and removing the crust of silica by etching to expose the polished surface of pure silicon.

A method which may be used for making the silicon wafers used in negative resistance devices is described in the application of R. S. Ohl, Serial No. 580,677, filed March 2, 1945, now Patent No. 2,469,569. This method comprises polishing a wafer of silicon to an optical finish, heating said wafer in an oxidizing atmosphere to form a layer of silica on the surface, etching the wafer to remove the outer layer of silica, and subjecting the surface to an electromotive force to break down the resistance of the surface layer.

When the wafer elements are made by the above-described methods one face of the element should be ground to facilitate the alloying with the bonding agent.

Of course, other methods besides those described above may be used to make the wafer for the negative resistance device or the rectifier.

Another embodiment of the invention is illustrated in Fig. 2, in which the elements being bonded are bodies of diamond and the bonding agent is a higher atomic weight element from Group IV-A of the periodic table. This figure shows an abrasive wheel made up of a central portion 16 having secured thereto a peripheral cutting portion 15 which is made up of diamond bodies embedded in a matrix of the bonding agent. Silicon and germanium are suitable bonding agents for this purpose, silicon being preferred.

In making such a tool using silicon as the bonding agent, industrial diamonds, which may be of any desired size, are mixed with powdered silicon which may be in the dry form or which may be mixed with a volatile liquid such as carbon tetrachloride, acetone, water or oil, to form a doughy mass. Any desired proportions of diamond and silicon may be used. The mass may then be molded under pressure to form the periphery 15 of a wheel such as shown in Fig. 2, or to form any other desired tool. The inner portion 16 of the wheel may be formed of any suitable material, such as a metal or a ceramic. The mass may then be heated in a vacuum to drive off the volatile liquid if one has been used, and to cause the silicon to wet the surface of the diamond. If silicon is used as the bonding agent, the mass is heated at a temperature high enough and for a time sufficient to melt the silicon particles at their surfaces but not enough to melt the particles entirely.

A similar cutting tool may be formed, substituting germanium for silicon as the bonding agent and using for the bonding temperature a point at or near the melting point of germanium. Other diamond tools may be made using silicon or germanium as the bonding agent for the diamonds, such as diamond dressing tools, diamond saws, diamond drills and similar devices.

The following examples will serve to illustrate the invention:

*Example 1.*—A tantalum cup, having a small portion of solid tin placed on it, was heated in a vacuum to a temperature of from 800° C. to 900° C. which caused the tin to melt and spread over the surface of the cup. The cup and the tin were then cooled, and a germanium wafer, especially treated to make it suitable for use as a rectifier, was placed on the surface of the tin. The cup was then heated again in a vacuum to a temperature of from 700° C. to 800° C. which caused the tin to melt and alloy with the surface of the germanium wafer. The tantalum cup was then spot-welded to a nickel base, and the unit was connected in a suitable circuit for use as a rectifier. The germanium wafer was found to be bonded very firmly to its base, so that even when operated at high temperatures, the bond still remained firm.

*Example 2.*—A portion of germanium was placed on a tantalum cup, and the whole was heated to a temperature of about 1000° C. in a vacuum to melt the germanium, after which the unit was cooled. A wafer of silicon, especially treated for use as a negative resistance element was ground on one face, and placed on top the germanium, with its ground face in contact with the germanium. The unit was then heated to about 1100° C. in a vacuum, which caused the germanium to melt and alloy with the surface of the silicon. The unit was then connected as a negative resistance device. The wafer was found to be firmly bound to its base even when the device was operated at high temperatures. The bond between the wafer and its base was also found to be highly conductive to electric current.

The method of the invention may, of course, be used to make other articles, besides those herein described.

Various changes and modifications may be made in the disclosed embodiments without departing from the spirit and scope of the invention.

The term "negative resistance device," as used in this specification, refers to a device in which positive increments of current take place with negative increments of electromotive force, with the result that the incremental resistance is negative.

What is claimed is:

1. An article comprising a body of an element from Group IV-A of the periodic table, as arranged by Deming, having an atomic number not greater than 32 and crystallized in the diamond cubic structure, said body being at least partially embedded in and autogenously bonded to a mass consisting of the element of said Group IV-A which lies in the next higher period above said first-mentioned element of which said body is formed.

2. An article as described in claim 1 wherein the first-mentioned element is silicon and the second-mentioned element is germanium.

3. An article as described in claim 1 wherein the first-mentioned element is germanium and the second-mentioned element is tin.

4. An article as described in claim 1, wherein the first-mentioned element is carbon in the diamond form and the second-mentioned element is silicon.

5. A current regulating device comprising a wafer of an element crystallized in the diamond cubic structure and chosen from the group consisting of silicon and germanium, and a base to which said wafer is bonded, said wafer being bonded to said base by a body of a bonding agent consisting of the element from Group IV-A of the periodic table, as arranged by Deming, lying in the next higher period above that in which lies the element of which said wafer is formed, said body of bonding agent being autogenously bonded to said wafer and to said base.

6. A device as defined in claim 5, wherein the device is a rectifier, wherein the wafer is formed of silicon and wherein the bonding element is germanium.

7. A device as defined in claim 5, wherein the wafer is formed of germanium and the bonding element is tin.

8. A tool containing diamond cutting particles, said tool comprising a base and particles of carbon in diamond form bonded to said base by a bonding agent consisting of silicon, the bond between said silicon and said diamond particles being antogenous.

9. The method of fastening a body of an element from Group IV-A of the periodic table, as arranged by Deming, having an atomic number not greater that 32 and crystallized in the diamond cubic structure, which comprises fusing a bonding agent consisting of an element from said Group IV-A which has a higher atomic number than, but is not removed more than two periods from, said first-mentioned element of which said body is formed, maintaining said bonding agent at a temperature above its fusing point, but below the melting point of said body, in contact with said body until said body is wet by said fused element and allowing said fused element to cool in contact with said body until it solidifies.

10. The method as described in claim 9, wherein the second-mentioned element lies in the next higher period of the periodic table above the first-mentioned element of which the body is formed.

11. The method of making an electrical current regulating device comprising fusing a portion of germanium onto the surface of a piece of tantalum, placing a wafer element formed of silicon on the germanium and heating the germanium sufficiently to cause it to alloy with the surface of the silicon wafer element.

12. The method of making a cutting tool ocmprising heating a mixture of diamond particles and a bonding agent consisting of silicon particles to a temperature high enough and for a time long enough to cause the silicon particles to sinter together and to form an autogenous bond to the adjacent diamond particles.

RUSSELL S. OHL.

REFERENCES CITED

The following references are of record in the file of this patent:

UNITED STATES PATENTS

| Number | Name | Date |
|---|---|---|
| 836,531 | Pickard | Nov. 20, 1906 |
| 962,262 | Schloemilch et al. | June 21, 1910 |
| 1,137,714 | Pickard | Apr. 27, 1915 |
| 1,182,946 | Bosburgh | May 16, 1916 |
| 1,708,571 | Hartmann et al. | Apr. 9, 1929 |
| 2,132,005 | Milligan | Oct. 4, 1938 |
| 2,174,453 | Gottlieb | Sept. 26, 1939 |
| 2,223,063 | Fitz Randolph | Nov. 26, 1940 |
| 2,228,871 | De Bats | Jan. 14, 1941 |
| 2,259,468 | Houchins | Oct. 21, 1941 |
| 2,338,351 | Van Der Pyl | Apr. 15, 1941 |

OTHER REFERENCES

Merritt: Proc. Nat'l Acad. of Science; vol. 11, 1925, pages 743–748.